W. G. STROZIER.
DOVETAIL CUTTER.
APPLICATION FILED JAN. 4, 1913.
1,070,635.
Patented Aug. 19, 1913.
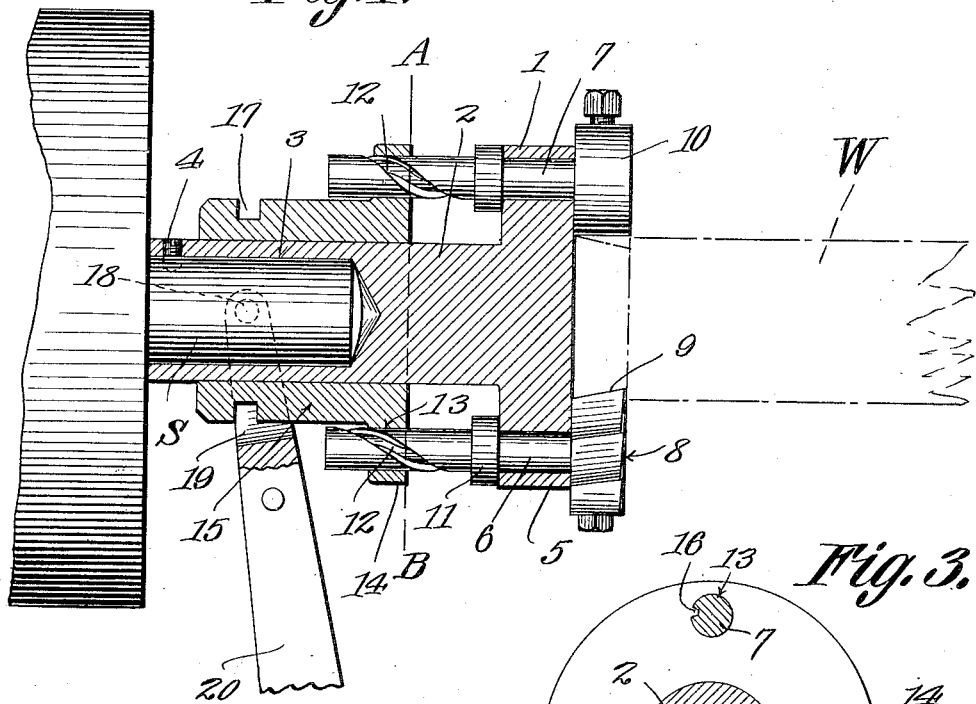
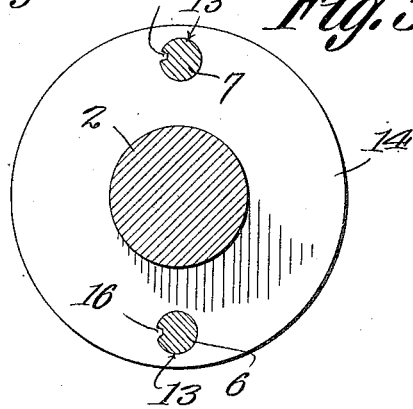
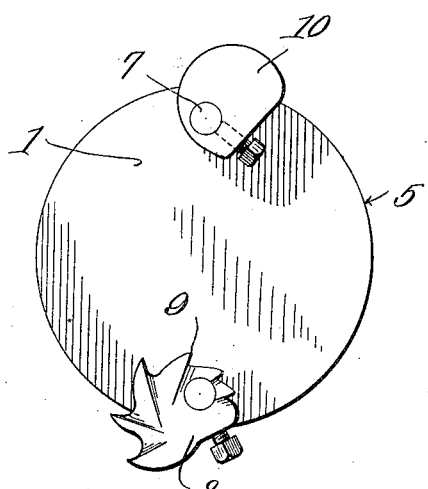
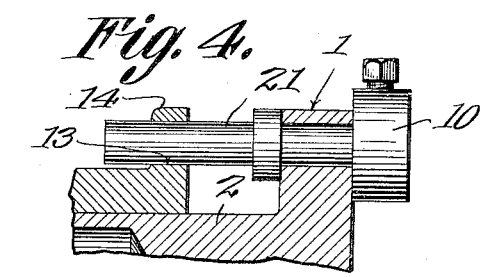
Witnesses
W. G. Strozier
Inventor,
by C. A. Snow & Co.
Attorneys.

UNITED STATES PATENT OFFICE.

WEBSTER G. STROZIER, OF WASHINGTON, DISTRICT OF COLUMBIA, ASSIGNOR OF ONE-HALF TO CHARLES C. SINCLAIR, OF WASHINGTON, DISTRICT OF COLUMBIA.

DOVETAIL-CUTTER.

1,070,635. Specification of Letters Patent. Patented Aug. 19, 1913.

Application filed January 4, 1913. Serial No. 740,223.

*To all whom it may concern:*

Be it known that I, WEBSTER G. STROZIER, a citizen of the United States, residing at Washington, in the District of Columbia, have invented a new and useful Dovetail-Cutter, of which the following is a specification.

This invention relates to tools for cutting upon balusters and like devices, dovetails such as employed in connecting balusters, etc., to stairs, balconies, and the like.

One of the objects of the invention is to provide a cutter head adapted to be connected to the spindle of an ordinary lathe, the said cutter head having a cutter which is adjustable about an eccentrically disposed axis for the purpose of bringing any one of a series of blades successively into engagement with the work so as thus to gradually reduce and shape that portion of the object fed to the tool.

Another object is to provide improved means for adjusting the cutting tool relative to the head while the head is rotating.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a central longitudinal section through the cutter head, the same being shown in position upon a lathe spindle. Fig. 2 is an end elevation of the cutter head. Fig. 3 is a section on line A—B Fig. 1. Fig. 4 is a section through a slightly modified form of device.

Referring to the figures by characters of reference 1 designates a disk-like head having a cylindrical extension 2 upon the back face thereof, this extension being concentric with the head and provided, at its free end, with a bore 3 designed to receive the spindle S of a lathe. This extension may be securely fastened to the spindle by means of a set screw 4 or in any other suitable manner.

Head 1 is provided, at diametrically opposed points, with bores 5 in which are journaled spindles 6 and 7. Spindle 6 is provided at one end with a cutting tool 8 which is eccentrically mounted on the spindle and is provided with a plurality of cutting edges 9 disposed at different distances from the axis of rotation of the tool and so disposed as to come successively into engagement with the work when the tool is rotated about its eccentric axis. The other spindle 7 has a cam 10 secured thereto and adapted to rotate therewith, this cam being of somewhat the same outline as the cutting tool 8 but being free of any cutting edges. The cam is merely provided to counter balance the tool 8 during the rotation of the cutting head and thus reduce vibration to the minimum. Both of the spindles 6 and 7 are provided with collars 11 which bear against the back face of the head 1 and thus serve to hold the tool 8 and the cam 10 close to the front face of the head. The spindles 6 and 7 project rearwardly from the collars 11 and these projecting portions are provided with spiral grooves 12 and project into diametrically opposed openings 13 formed within a flange 14. This flange extends annularly from a sleeve 15 mounted to slide upon the extension 2. Lugs 16 extend from the walls of the openings 13 and into the spiral grooves 12 so that, when sleeve 15 is shifted toward or from the head 1, the spindles 6 and 7 will be caused to rotate, thus producing a corresponding movement of the tool 8 and cam 10.

An annular groove 17 is formed in the sleeve 15 and is engaged by lugs 18 extending inwardly from the terminals of a fork 19. This fork is formed at one end of a lever 20 and it will thus be seen that when the lever is swung upon its fulcrum, the lugs 18 will shift the sleeve 15 longitudinally along the extension 2 so as thus to cause the spindles 6 and 7 to rotate simultaneously.

It is to be understood that the head 1 and all of the parts connected thereto rotate with the spindle S and the stock to be shaped, and which has been indicated by dotted lines at W is fed end first against the front face of the head 1. While the stock is thus held centered against the head, lever 20 is shifted so as to move sleeve 15 gradually toward the head 1. During this movement the lugs 16 will travel within the spiral grooves 12 and cause the spindles 6 and 7 to rotate slowly thereby bringing one of the cutting edges 9 into engagement with the stock. As soon as this cutting edge has cleared the stock from the path thereof, the spindles are again rotated by shifting sleeve 15, thus bringing the next cutting edge into engagement with the stock. Thus it will be seen that, by moving the cutting edges successively into engagement with the stock, the stock can be quickly shaped. In the construction shown the cutting edges are so arranged as to produce a frusto-conical dovetail or tongue upon the end of the stock. It is to be understood, however, that the cutting edges can be of any other desired contours so as to produce other shapes than the one described.

Importance is attached to the fact that, by providing a structure such as herein described, the cutting edges of the series provided on the cutting tool can be fed gradually and successively against the stock so as to reduce the stock transversely, this adjustment being effected without interfering with the continuous rotation of the cutter head on which the tool is mounted.

Instead of mounting the counter balance 10 for rotation, as hereinbefore described, said cam or counter balance can be mounted on a spindle 21 which is not grooved and which will not, therefore, rotate during the adjustment of the cutting tool. It has been found, however, that the tool is better balanced where the cam is adjusted in the manner hereinbefore described.

What is claimed is:—

1. The combination with a revoluble cutter head, of a spindle revoluble with the head and parallel with the axis of rotation of the head, a cutting tool eccentrically mounted on the spindle and having a plurality of cutting edges arranged successively around the periphery and disposed at different distances from the spindle, said spindle being provided with a spiral, and means shiftable along lines parallel with the axis of rotation of the cutter head and engaging the spiral for rotating the spindle and the tool during the movement of said means, to bring the cutting edges successively into engagement with the side of the work.

2. The combination with a revoluble cutter head having an extension, of a spindle mounted for rotation in the head and parallel with the axis of rotation of the cutter head, a cutting tool eccentrically mounted on one end of the spindle and having a plurality of cutting edges arranged successively around the periphery and disposed at different distances from the spindle, said spindle being provided with a spiral groove, and means slidably mounted on the extension and engaging the grooved portion of the spindle for rotating the spindle and the tool during the movement of said means to bring the cutting edges of the tool successively into engagement with the side of the work.

In testimony that I claim the foregoing as my own, I have hereto affixed my signature in the presence of two witnesses.

WEBSTER G. STROZIER.

Witnesses:
SELINA WILLSON,
CHAS. C. SINCLAIR.

---

Copies of this patent may be obtained for five cents each, by addressing the "Commissioner of Patents, Washington, D. C."